UNITED STATES PATENT OFFICE.

N. SPENCER THOMAS, OF PAINTED POST, NEW YORK.

IMPROVED PROCESS FOR MAKING CONCENTRATED FLUID EXTRACTS.

Specification forming part of Letters Patent No. 46,156, dated January 31, 1865.

*To all whom it may concern:*

Be it known that I, N. SPENCER THOMAS, of Painted Post, in the county of Steuben and State of New York, have invented a new and Improved Process for Making Concentrated Fluid Extracts; and I do hereby declare that the following is a full, clear, and exact description of the same.

This invention relates to an improved process of producing that class of extracts which are made so that a certain amount of liquid shall represent, pound by pound, medically the same quantity of crude drug, and which are generally obtained by extracting with a large excess of liquid and evaporating down to the desired strength.

The disadvantages of the old process are well-known to every chemist. The menstrua used for making extracts are usually of an etherial or volatile nature—such as alcohol of various strength—and their strength changes by evaporation as they are exposed for a longer or shorter period to the open atmosphere. If such menstruum is poured over a certain drug, it dissolves and extracts more or less of the soluble parts of the same, according to its strength; but if the same liquid has to be poured repeatedly over the same drug it loses in strength alcoholically, and some of those portions first dissolved are precipitated, and an imperfect extract is the result, the value of the extract being determined by its alcoholic strength when finished. The same or similar reasons render it objectionable to subject the extract, when first obtained, to the evaporating process, for by this process the volatile or spirituous parts of the menstruum are first evaporated, and the weaker liquid is not capable to keep in solution many of those parts of the drug which originally had been dissolved in the extract. These objections are obviated by my process, which is carried out in the following manner: I first weigh off a quantity of drug and the same quantity or more, by weight, of the menstruum or liquid by means of which the extract is to be made, a little more of the menstruum being required, as a little moisture is left in at last pressing. The drug, being ground to proper fineness, is then dampened with a small portion of the liquid and subjected to heavy pressure—say from eight hundred to one thousand tons—whereby all the liquid, or nearly so, together with such parts of the drug which have dissolved in the same, is expressed. A fresh portion of the liquid is then sprinkled over the drug, a little time being allowed for the liquid to dissolve the soluble parts of the drug, and the same process of pressing repeated until the whole quantity of liquid is used up and the drug is completely exhausted and the required measure obtained.

By this process an extract is obtained which represents, pound by pound, the crude drug, the drug is perfectly extracted, and the menstruum preserves its original strength throughout, so that the same is capable to retain in solution all those parts which are dissolved during the various stages of the process. Furthermore, by my process the tedious and expensive process of evaporation is dispensed with, and concentrated fluid extracts of any description can be produced cheaper and better than by any process heretofore applied, and as the application of heat is entirely avoided the preparation does not receive the injury by heat that all such preparations are liable to if heat is applied to them, no matter how carefully applied or moderate the degree of temperature; and, furthermore, the change thereby of strength of solvent is avoided.

What I claim as new, and desire to secure by Letters Patent, is—

The within-described process of producing concentrated fluid extracts by bringing the crude drug gradually in contact with the desired measure of liquid to be represented by the extract, and exposing it after each application of liquid to a heavy pressure, substantially as set forth, whereby extracts of uniform strength can be made and both heat and evaporation are avoided.

N. SPENCER THOMAS.

Witnesses:
C. F. PLATT,
A. J. BANTER.